Jan. 3, 1967  G. E. RUBERT ET AL  3,295,681
WATER COOLING AND AERATING DEVICE FOR FISH TANKS AND THE LIKE
Filed Oct. 4, 1963
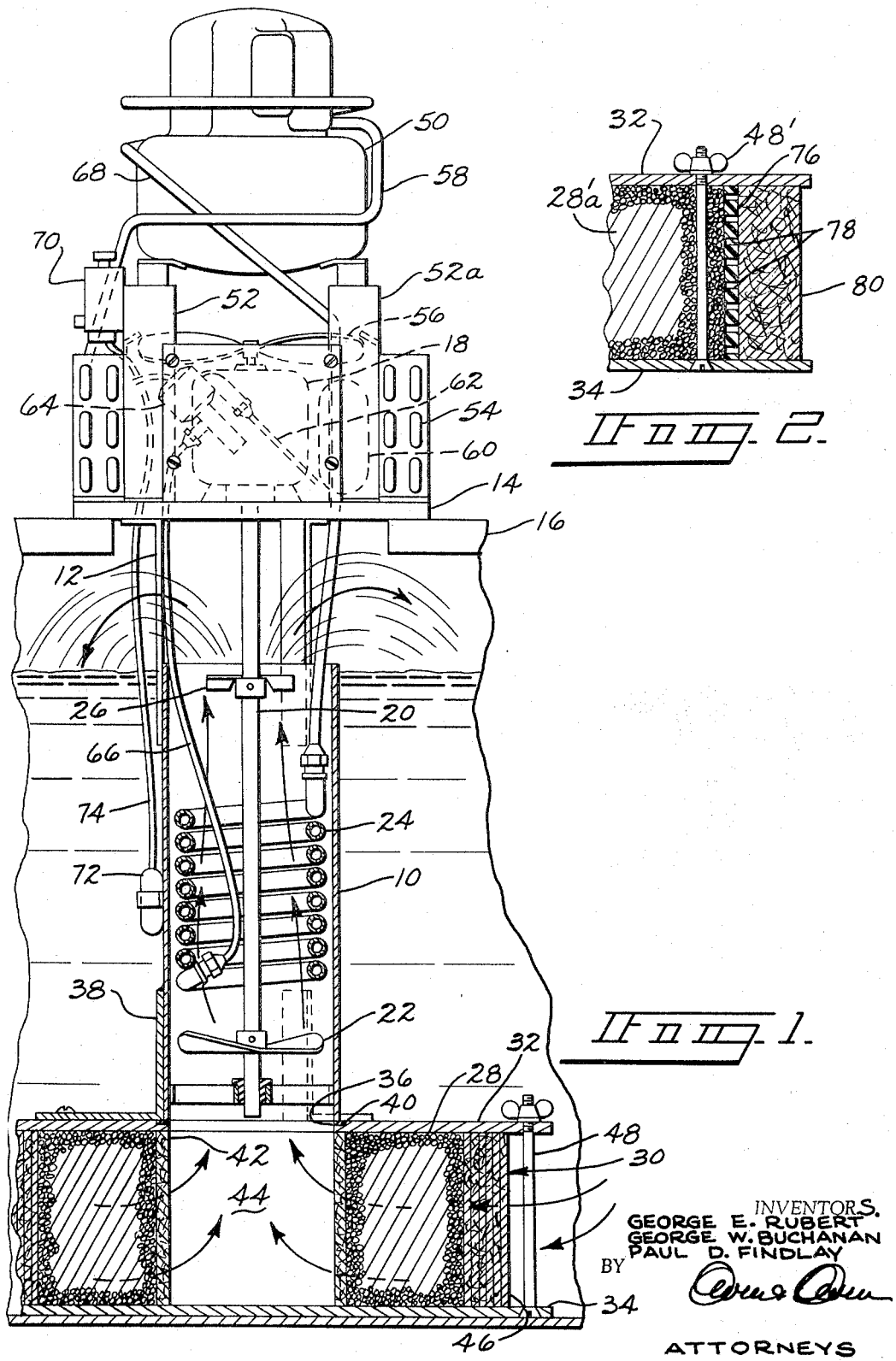
INVENTORS.
GEORGE E. RUBERT
GEORGE W. BUCHANAN
PAUL D. FINDLAY
BY
ATTORNEYS 3,295,681
WATER COOLING AND AERATING DEVICE
FOR FISH TANKS AND THE LIKE
George E. Rubert, George W. Buchanan, and Paul D. Findlay, Toledo, Ohio, assignors to Frigid Units Inc., Toledo, Ohio, a corporation of Ohio
Filed Oct. 4, 1963, Ser. No. 313,811
8 Claims. (Cl. 210—169)

The present invention relates to devices for cooling and aerating the water of fish tanks and the like.

An object of the present invention is the provision of a new and improved cleaning and aerating device for the water of a fish tank and the like, which aerates the water of the tank with greater efficiency than have the prior art devices.

Another object of the present invention is the provision of a new and improved cleaning and aerating device of the above described type which utilizes a bed of a surface active agent that is totally submerged and through which the water passes before it is cooled and aerated.

A further object of the present invention is the provision of a new and improved device of the above described type having a bed of surface active material that is protected by a filter so constructed that a surface portion can be removed when it becomes plugged to expose a fresh surface of the filtering material without taking the unit out of operation.

The invention resides in certain constructions and combinations and arrangements of parts; and further objects and advantages of the invention will become apparent to those skilled in the art to which it relates from the following description of the preferred embodiment described with reference to the accompanying drawing forming a part of this specification, and in which:

FIG. 1 is a fragmentary sectional view of a minnow tank in which a cooling and aerating structure embodying the present invention is mounted, and in which certain portions of the structure are shown in section; and FIG. 2 is a fragmentary sectional view of another embodiment of filter box structure which permits the filter material to be readily replaced.

The device shown in the drawing generally comprises a vertical tube 10 through which water flows, as will later be explained, and the bottom end of which is arranged to take suction adjacent the bottom of a tank, while the top of the tube extends generally to the water line of the tank in which it is placed. The tube 10 may be supported in any suitable manner, and as shown in the drawing, is supported by means of three brackets 12 which depend from a horizontal support plate 14. The support plate 14 in turn may be supported in any suitable manner, and shown in the drawing, is supported by horizontal member 16 that in turn is supported by the top of the tank structure in which the mechanism is placed.

The structure shown in the drawing further includes an electric motor 18 which is supported by the support plate 14, and which has a vertical shaft 20 which is positioned coaxially of the vertical tube 10, and the lower portion of which projects down into the vertical tube 10. A propeller 22 is affixed to the bottom end of the vertical shaft 20, and is arranged so that upon rotation of the vertical shaft 20, water is caused to flow upwardly through the vertical tube. A cooling coil 24 is positioned in the vertical tube 10 preferably in the region just above the propeller 22 to receive the high velocity discharge of water from the propeller, so that the thickness of the heat transfer film on the water side of the cooling coil is kept to a minimum. After the water is cooled by the cooling coil 24 it flows to the upper end of the vertical tube 10 where means is provided for efficiently introducing air into the water as it leaves the top of the tube 10. In those instances where the design of the unit is such that a large flow rate is experienced through the vertical tube 10, the means for introducing air into the water may comprise but a portion of the upper end of the vertical tube 10 which projects an appreciable distance above the water line of the tank. Some swirling action of the water is produced by the propeller 22, and where the flow of water through the tube 10 is large, the water will be projected radially outwardly from the upper end of the tube free and clear of the tube, so that air is mixed with the water as it impinges upon the surface of the water in the tank. In the preferred embodiment shown in the drawing, however, at least one flipper blade 26 is affixed to the vertical shaft 20 adjacent the top end of tube 10, so that it churns up the water that is discharged from the top end of the vertical tube to cause air to flow downwardly along the shaft and then be intimately mixed with the water. The flipper blade 26 also implements or increases the swirling action of the water, so that the water will be thrown free and clear of the vertical tube and thereby facilitate the dispersion of the cool and aerated water throughout the tank in which the mechanism is situated. It is a known principle that cold water absorbs more oxygen than does warm water. By cooling the water before it is aerated, a large driving force is created for the absorption of the air into the water, so that the efficiency of the aerating portion of the device is at a maximum.

In the type of construction described, the length of time that free air is in contact with the water before it falls back into the main body of water is very short, so that the sequence of cooling of the water before it is aerated is a very important factor contributing to the overall aerating efficiency of the device.

The cooling and aerating device of the present invention is intended to make it possible to maintain a very high density of fish life in a fish tank. It has been found that when small fish or minnows of the type which travel in schools are disturbed, they secrete an organic substance (presumably as a defensive mechanism) which substance produces a foaming action and further tends to reduce the ability of the water to absorb oxygen.

According to the invention, it has been found that a surface active material, or adsorbent such as activated charcoal, will remove this organic substance secreted by the minnows when they are disturbed, and further that the aerating efficiency can be greatly increased by first passing the water which is to be aerated through the surface active material to remove the organic substance before the water is aerated. It will therefore be seen that by cooling the water to well below tank temperature before introducing the air into the water that a maximum amount of air can be absorbed by the water, and further that by absorbing the organic secretion of the fish from the water before it is cooled, that a further benefit is derived both by decreasing foaming action around the cooling coil, and also by assuring that a maximum amount of air will be picked up by the water.

In order that maximum benefit will be derived from the surface active adsorbent, it is highly desirable that air or other gases be completely eliminated from the pores of the adsorbent, and that the pores of the adsorbent be completely filled with water to aid in the transfer of the organic substance flowing around the granules of the adsorbent to the internal surface area of the adsorbent. This is achieved in the device of the present invention by totally submerging the adsorbent, and further by positioning the adsorbent upstream of the cooling aerator where no air bubbles exist and the oxygen content of the water is at a minimum. To prolong the life of the adsorbent, it is preferable that the water flow to the adsorbent be first filtered to remove any solids which might plug up the pores of the adsorbent as well as remove any solid organic secretion of the fish that may exist.

In the embodiment shown in the drawing, an adsorbent 28, which in the present instance is activated charcoal, and a filter material 30 are supported by top and bottom parallel plates 32 and 34 respectively. The top plate 32 has an opening 36 therein into which the bottom end of the vertical tube 10 extends, and the top plate 32 is attached to the vertical tube 10 by means of three L-shaped brackets 38. Bottom plate 34 is shown positioned adjacent the bottom of the fish tank. An annular gasket 40 may be provided to seal off the opening between the top plate 32 and the bottom end of the vertical tube 10. In most instances it will be necessary to confine the adsorbent material 28 so that it is not sucked up into the propeller 22, and in the embodiment shown in the drawing, an annular partition 42 of porous filter material is provided radially inwardly of the adsorbent material 28 to hold the adsorbent material 28 in place. By confining the adsorbent material 28 to a generally annular bed of equal radial thickness, substantially the same rate of fluid flow is experienced through all portions of the adsorbent material and a maximum service life of the material is obtained. By use of an annular inner partition 42, which in some instances may be a fine screen, a well 44 is provided from which the propeller 22 may take suction so that a smooth and uniform flow to the propeller is achieved.

As previously indicated, it is an object of the present invention that the cooling and aerating unit can be operated over extended periods of time without being removed from the fish tank for servicing. It has been found that in tanks where a high fish density exists, that one of the first difficulties that is encountered is a plugging up of the outer surface of the filter material 30 which surrounds the adsorbent material 28. In the preferred embodiment of the invention shown in the drawing, therefore, the filter material 30 is made of a plurality of 360° sections of thin-walled filter material that are loosely bonded together to provide a rigid filter structure. While such a filter structure can be made by means of a plurality of annular rings of material, a preferred embodiment of filter is achieved by a spirally-wound thickness of fiberglass that is held together by a suitable resinous binder, the overlapping spirally-wound layers of which are bound together in such manner that they can be pulled apart at their juncture without physically damaging any of the inner layers.

When the flow through the vertical tube 10 is diminished to an undesirable extent, it is intended that an attendant will reach down into the water of the tank and unwrap the outer 360° or layer 46 of the filter material and remove this layer by slicing the outer layer 46 vertically with a razor blade. By so doing, the plugged surface of the filter is removed without taking the unit out of operation, and a fresh filter surface is brought into operation to restore the unit to its full operating efficiency. The partition 42 and the filter material 30 may be held in position between the plates 32 and 34 in any suitable manner, and, as shown in the drawing, are frictionally retained by the plates 32 and 34 by means of a plurality of through bolts 48, only one of which is shown.

While the cooling coil 24 may be supplied with a coolant in any suitable manner, it is desired that the cooling and aerating device, as well as the device which supplies coolant to the coil 24, will be a self-contained unit. The device shown in the drawing includes a sealed motor compressor unit 50 that is located directly above the motor 18 and which is suitably supported from the bed plate 14 by means of U-shaped brackets 52 and 52a. An annular condenser structure 54 is positioned on top of the bed plate 14 radially outwardly of the U-shaped brackets 52, and the portion of the vertical shaft 20 which extends upwardly out of the motor 18 is provided with a fan blade 56 which sucks air through the condenser 54 to cool the condenser 54 and motor 18, and then discharge the air upwardly to circulate it around and cool the sealed motor compressor unit 50. High pressure gases from the motor compressor unit 50 flow through conduit 58 to the condenser 54. Liquid refrigerant from the condenser 54 collects in receiver 60 and then flows through conduit 62 to a throttle valve 64 which discharges through conduit 66 to the lower end of the cooling coil 24. A conduit 68 communicates the gases from the cooling coil 24 to the suction of the compressor 50 to complete the circuit of the refrigerant.

It is desired that the cooling and aerating unit of the invention will maintain the air content of the water in the fish tank as close to one hundred percent saturated as possible while maintaining the temperature of the water at a predetermined minimum (say 54° F.). Depending upon the size of the tank in which the unit is used, as well as ambient conditions, there will sometimes be an excess of refrigeration capacity over that required to maintain the tank at the minimum desired temperature. Accordingly, a temperature sensitive switch 70 is provided in the power line to the sealed motor compressor unit 50 to shut off the compressor unit when the temperature of the water in the tank is lower than the desired temperature. In the embodiment shown in the drawing, the temperature sensing switch 70 is actuated by means of a vapor pressure bulb 72 that is connected to the temperature sensing switch by means of a capillary tubing 74. Inasmuch as it is desired to maintain the oxygen content of the water of the tank as close to its saturation point as is possible at all times, the motor 18 will usually run continually and the temperature sensitive switch 70 will merely start and stop the sealed motor compressor unit 50 as is required to maintain the desired water temperature of the tank.

As previously indicated, the length of time that air is in contact with the water between the time that it leaves the top of the tube 10 and the time that it returns to the main body of water in the tank is quite short, and it will usually be necessary to maintain a relatively rapid rate of flow through the tube to achieve maximum aeration of the water, as well as produce efficient heat transfer by the coil 24, and maximum recirculation of the water in the tank to hold all portions of the tank at the desired minimum temperature. For some applications, it may be desirable for economic reasons to provide a structure containing the adsorbent material 28 and filtering material 30 having a flow capacity that is less than is desired to the vertical tube 10. In such instances, it may be desirable to by-pass some of the water around the filter 30 and adsorbent material 28 such as by providing holes through the tube 10 below the propeller 22.

FIG. 2 of the drawing shows another embodiment of support structure for the filter and adsorbent materials which differs from that previously described principally in that a vertical wall structure 76, which may be of a permanent nature, extends around the periphery of the structure between the top and bottom plates of the structure. Those portions of the structure shown in FIG. 2, which correspond to similar portions of the embodiment shown in FIG. 1 are designated by a like reference numeral, characterized further in that a prime mark is affixed thereto. As shown in FIG. 2, the wall portion 76 is made from plastic and has a plurality of holes 78 therethrough through which water enters the body of the structure between the plates 32 and 34. It is intended that the holes 78 will be sufficiently small to prevent escape of the adsorbent material 28a and be sufficient in number to provide a large enough flow area to prevent an undue restriction to the water entering the vertical tube 10.

In the embodiment shown in FIG. 2, a strip of filter material 80 is wrapped around over the outside of the wall structure 76 to provide a replaceable type of filter. The strip of filter material 80 preferably extends in one continuous strip around the entire periphery of the filter box structure with the ends being butted together in a region of the wall 76 wherein no holes 78 are provided. The abutting ends of the filter material 80 may be held in place by means of any suitable type of clip, since the force of the water flowing through the material is always in a direction to hold the filter material against the wall structure 76. When the filter material 80 becomes clogged, an attendant need merely reach down and undo the fastening means holding the ends of the filter material 80 together, and remove the plugged strip of filter material 80. Thereafter the attendant can wrap a new piece of filter material 80 around the outside of the wall 76 and secure it in place to restore the unit to its original efficiency.

It will be apparent that the objects heretofore enumerated as well as others have been accomplished, and that there has been provided a cooling and aerating structure for minnow tanks and the like which processes the water in a very desirable sequence of operations to achieve a maximum cooling and aerating effect for the water of the tank in which the unit is situated.

While the invention has been described in considerable detail, we do not wish to be limited to the particular embodiment shown and described, and it is our intention to cover hereby all novel adaptations, modifications, and arrangements thereof which come within the practice of those skilled in the art to which the invention relates.

What we claim is:

1. In a cooling and aerating device for fish tanks and the like having a generally predetermined water line: a support plate adapted to be supported adjacent the top of the tank above the water line in the tank, a vertical tube having an upper open end, said vertical tube being spaced from said support plate with the upper open end of said tube terminating generally in the region of the water line of the tank, a motor having a vertical shaft supported generally coaxially of said vertical tube, a propeller supported by said shaft inside said vertical tube for moving water vertically through said tube, a cooling coil positioned inside said tube above said propeller in such position that water propelled by said propeller flows over said cooling coil, means at the upper end of said vertical tube for introducing air into water flowing out of the top of said tube, a top filter plate member having an opening therethrough through which water to said vertical tube passes, a bottom filter plate member spaced beneath said top filter plate member, a porous retainer extending vertically between said filter plates and surrounding said opening in said top plate, a vertically extending filter positioned between said filter plates and spaced radially outwardly from said porous retainer, surface active material positioned in the space between said porous retainer and said filter, said filter comprising a plurality of layers which extend between said filter plates, which overlie each other, and which are separable from each other, a sealed motor-compressor unit mounted on said support plate above said motor, a condenser mounted on said support plate, said condenser receiving refrigerant from said compressor and discharging it to said cooling coil, and a fan mounted on the shaft of said motor for causing air to flow through said condenser and over said sealed motor-compressor unit.

2. In a cooling and aerating device for fish tanks and the like having a generally predetermined water line: a support plate adapted to be supported adjacent the top of the tank above the water line in the tank, a vertical tube having an upper open end, said vertical tube being spaced from said support plate with the upper open end of said tube terminating generally in the region of the water line of the tank, a motor having a vertical shaft supported generally coaxially of said vertical tube, a propeller supported by said shaft inside said vertical tube for moving water vertically through said tube, a cooling coil positioned inside said tube above said propeller in such position that water propelled by said propeller flows over said cooling coil, means at the upper end of said vertical tube for introducing air into water flowing out of the top of said tube, a top filter plate member extending around said vertical tube, a bottom filter plate member spaced beneath said top filter plate member, a porous retainer through which water flowing between said filter plates passes before reaching said propeller, a generally vertical outer peripheral wall having openings therein through which water enters between said filter plates, a removable generally vertically extending piece of filter material wrapped around said vertical outer wall to filter water entering between said filter plates, surface active material positioned between said porous retainer and said filter material, a sealed motor-compressor unit mounted on said support plate above said motor, a condenser mounted on said support plate, said condenser receiving refrigerant from said compressor and discharging it to said cooling coil, and a fan mounted on the shaft of said motor for causing air to flow through said condenser and over said sealed motor-compressor unit.

3. The cooling and aerating device of claim 2 wherein the means for introducing air into the water flowing out of the top of the vertical tube comprises a section of the tube which extends above the water line of the tank by a sufficient distance to produce a cascading effect wherein air is introduced into the water as it falls back into the tank.

4. The cooling and aerating device of claim 2 wherein the means for introducing air into the water flowing out of the top of the vertical tube comprises at least one element fixed to the vertical shaft adjacent the top of the tube to produce a centrifugal action which draws air down along the shaft and mixes it with the water as it flows out of the top of the vertical tube.

5. In a cooling and aerating device for a fish tank and the like having a generally predetermined water line: a support plate adapted to be supported adjacent the top of the tank above the water line in the tank, a vertical tube having an upper open end, said vertical tube being spaced from said support plate with the upper open end of said tube terminating generally in the region of the water line of the tank, a motor having a vertical shaft supported generally coaxially of said vertical tube by said support plate, a propeller supported by said shaft inside said vertical tube for moving water vertically through said tube, a cooling coil positioned in said tube, and an aerating blade extending generally radially from and fixed to said vertical shaft adjacent the upper end of said tube above said cooling coil for subdividing water issuing from said vertical tube and imparting a tangential velocity thereto, whereby aerated water issuing from said vertical tube has a tangential component for circulating the water in the fish tank.

6. In a cooling and aerating device for a fish tank and the like having a generally predetermined water line: a support plate adapted to be supported adjacent the top of the tank above the water line in the tank, a vertical tube having an upper open end, said vertical tube being spaced from said support plate with the upper open end of said tube terminating generally in the region of the water line of the tank, a motor having a vertical shaft supported generally coaxially of said vertical tube, a propeller supported by said shaft inside said vertical tube for moving water vertically through said tube, a cooling coil positioned inside said tube, an aerating blade extending generally radially from and fixed to said vertical shaft adjacent the upper end of said tube above said cooling coil for subdividing water issuing from said vertical tube, and a bed of surface active material arranged so that the water entering said tube passes through said bed before being cooled by said cooling coil and before being aerated, whereby foam producing secretions of the fish are removed before the water is cooled, and the water issuing from said tube is subdivided and thrown through the air back to the tank in a manner supersaturating the water with air at a temperature below the normal water temperature of the fish tank.

7. In a cooling and aerating device for a fish tank and the like having a generally predetermined water line: a support plate adapted to be supported adjacent the top of the tank above the water line in the tank, a vertical tube having an upper open end, said vertical tube being spaced from said support plate with the upper open end of said tube terminating generally in the region of the water line of the tank, a motor having a vertical shaft supported generally coaxially of said vertical tube, a propeller supported by said shaft inside said vertical tube for moving water vertically through said tube, a cooling coil positioned inside said tube, an aerating blade extending generally radially from and fixed to said vertical shaft adjacent the upper end of said tube above said cooling coil for subdividing water issuing from said vertical tube, a bed of surface active material arranged so that the water entering said tube passes through said bed before being cooled by said cooling coil and before being aerated, and filtering material arranged so that the water which passes through said bed is first filtered by said filtering material, whereby foam producing secretions of the fish are removed and a maximum of water supersaturated with air at a temperature below the normal water temperature of the tank is recirculated thereto.

8. The device of claim 5 wherein the upper end of said tube is adapted to be above the liquid level of the fish tank, and said device is generally devoid of obstructions surrounding the upper end of said tube which interferes with free fall of the issuing water back to the liquid level of the fish tank.

References Cited by the Examiner
UNITED STATES PATENTS

| | | | |
|---|---|---|---|
| 364,599 | 6/1887 | Morris | 210—461 |
| 597,249 | 1/1898 | Smith | 210—169 X |
| 1,535,112 | 4/1925 | Duke et al. | 210—461 X |
| 1,611,095 | 12/1926 | Wilhelm | 210—178 X |
| 2,055,872 | 9/1936 | Manning | 210—387 X |
| 2,073,847 | 3/1937 | Miller | 210—149 |
| 2,152,863 | 4/1939 | Bills | 210—187 X |
| 2,194,037 | 3/1940 | Thuma | 210—169 |
| 2,303,757 | 12/1942 | Pierson | 210—169 X |
| 2,533,936 | 12/1950 | Holmes et al. | 210—169 |
| 2,676,921 | 4/1954 | Vansteenkiste | 210—169 |
| 3,110,170 | 11/1963 | Long | 210—184 |
| 3,132,501 | 5/1964 | Jacobs et al. | 210—315 X |
| 3,205,588 | 9/1965 | Oetjen et al. | 210—184 |

REUBEN FRIEDMAN, *Primary Examiner.*

J. DE CESARE, *Assistant Examiner.*